Jan. 13, 1970   E. R. KATAN, SR., ET AL   3,489,459
VEHICLE SEAT WITH FALL-AWAY RECLINE SEAT SECTION
Filed April 16, 1968

INVENTORS:
Earl R. Katan, Sr.
Kirby B. Weik
Earl R. Katan, Jr.

BY: *James R. Hoatson, Jr.*
*Philip T. Liggett*
ATTORNEYS 3,489,459
**VEHICLE SEAT WITH FALL-AWAY
RECLINE SEAT SECTION**
Earl R. Katan, Sr., Kent, Kirby B. Weik, Litchfield, and
Earl R. Katan, Jr., Kent, Conn., assignors to Universal
Oil Products Company, Des Plaines, Ill., a corporation
of Delaware
Filed Apr. 16, 1968, Ser. No. 721,794
Int. Cl. A47c 1/032; B60n 1/06
U.S. Cl. 297—316
4 Claims

ABSTRACT OF THE DISCLOSURE

A vehicle seat construction providing a reclining seat back and a suspended seat frame which is movable in the fore and aft directions. The rear portion of the seat framing is suspended from pivot connection means to the seat back framing which is substantially above the pivot point for the seat back recline whereby, upon seat back recline, the rear portion of the seat frame will be caused to move down proportionately to the degree of recline and the lowering of the pivot connection means to the back framing and the entire seat frame is moved in an aft direction, to thereby enhance passenger seating comfort.

---

The present invention relates to an improved, more comfortable, form of vehicle seat with back recline and a moving seating section. More particularly, the invention is directed to the modified means for suspending the frame for the seat portion itself such that, as the seat back is reclined, the seat will move back a predetermined proportional distance and, at the same time, the rear portion of the seat will move downwardly.

The usual or conventional seat framing provides that the seat bottom remains at the same angle to the floor when the seat back is reclined. This condition makes the seat occupant feel as if he were sliding off the front of the seat, particularly at full seat back recline. The term "seat bottom" as used herein shall mean the seat cushion and its supporting frame or pan. Some special forms of seats have provided that the lower portion of the seat back effect an arched-out position to support the lumbar region of the back of the occupant; however, again, there have been no provisions to move the seat bottom in an aft direction or to have the rear section thereof drop along with back recline and improve the seating angle with respect to the floor.

Actual studies of passenger comfort in a seat reveals various factors with respect to angular positioning of the knees and of the body. For example, it appears that the seat bottom or cushion angle should normally have a slight slope from front to back and that a passenger's knees should keep an angle of 90° or more. Less than a 90° angle will result in a gradual cramping of the legs. It also seems that the hip angle (between thighs and trunk) must be at least 90° but preferably about 100°, or more, for a long sitting period.

The studies further reveal that for optimum comfort in recline, that the buttocks of the seat occupant should be permitted to drop to a position lower than that utilized in a conventional upright position. As to actual recline, where approximately 180° might be considered ideal, an angle of at least about 135° from the horizontal was determined as a satisfactory goal. While, with respect to the seat bottom, the recline should be so as to effect at least about 120° between the back and the seat cushion.

Thus, it may be considered a principal object of the present invention to provide a reclining back type of vehicle seat which has a seat bottom in a suspended frame that can move fore and aft and have its rear portion lowered as the seat back is reclined.

It may be considered a further object of the invention of the present improved seat framing system to provide the movable seat frame portion to be retracted over slide or roller means at a front end portion so that such front edge keeps a substantially constant height while the rear seat portion is moved lower along with an aft movement for back recline positionings.

Briefly, the present invention may be considered to provide a vehicle seat with an adjustable reclining back and a movable seat section providing both retraction and the lowering of its rear portion upon back recline, which comprises in combination, base framing, a back frame having its lower end hingedly connected to the top of said base framing from pivot point means, a suspended seat frame disposed across the top portion of said base framing and movable in the fore and aft direction with respect to the back frame, said seat frame having upwardly projecting portions effecting pivot connection means with the seat back frame at a level substantially above the recline pivot point means, and movable support means between the front end portion of said seat frame and said base framing whereby, upon seat back frame recline, the rear portion of said seat frame will move down in a proportionate manner to the degree of lowering of the pivot connection means of the seat frame to the back frame and the entire suspended seat frame is moved in an aft direction.

Generally, the rear connection of the seat framing, including a seat pan section which holds the cushioning, will be connected to a hinge or pivot connection on the reclining seat back a distance of about 6″ to 7″ upwardly from the lower pivot point for the seat back itself. This spaced distance upwardly from the lower back pivot point will in turn provide a slight lowering of the rear portion of the seat as well as an aft movement to in turn provide the desired improved seating comfort. The amount of seat bottom movement to the rear and the amount of lowering of the rear portion of the seat cushion will of course be only a proportion of the amount of the movement of the seat connection or suspension point to the seat back framing. However, generally, the rearward or aft movement of the seat may be of the order of 2″ for the full recline movement of the seat back from its normal upright position to an approximate 45° slope. At the same time, the angle or slope of the seat cushion, downwardly to the rear, will be increased generally from about 8° to 12° with respect to the horizontal.

Inasmuch as it is desired to keep the front edge portion of the movable seat framing and seat cushion at about the same distance from the floor as is provided in the upright position, there is preferably utilized suitable roller means, or a slidable bearing surface, under the front edge portion of the seat framing such that the seat itself may move both fore and aft with a minimum of friction and with substantially no dimensional change with respect to the floor. Actually, the front roller means, or other bearing, will serve as a pivot point with respect to the movement of the rear end portion of the seat bottom which is caused to be lowered as the seat back reclines and the hinge or pivot connection means between the seat framing and seat back framing moves to a somewhat lower position along an arc being scribed from the lower end connection of the seat back framing to the seat base.

Inasmuch as the present improved seat construction system has the seat pan, or other portion which holds the seat cushioning, in a suspended arrangement directly connective with the seat back framing, there may be provision to effect the back adjustment, or more specifically, the locking of the seat back recline position, through the use of recline lock means that connects directly to the seat frame. In other words, the recline lock may be mounted so as to have one end connected to the fixed seat base and have the other end connected to a lateral strut or other framing member which is a portion of the suspended seat frame. Then, since the latter connects with the seat back framing at a point elevated about the seat back pivot point level, the locking of the seat frame will provide a corresponding locking of the seat back.

Reference to the accompanying drawing and the following description thereof will serve to more fully illustrate the construction and arrangement of the present improved movable seat section for a reclining type passenger seat. At the same time, there will be indicated the angular relationships of the seat bottom and the seat back for providing high levels of passenger comfort.

Figure 1:
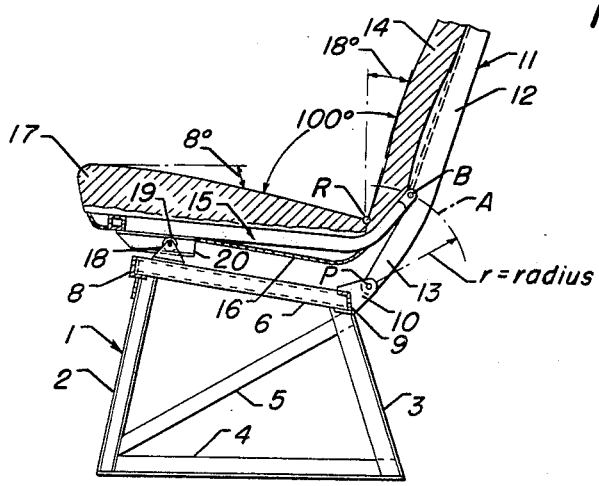
FIGURE 1 of the drawing is a diagrammatic sectional elevational view through a vehicle seat utilizing the present improved suspended form of seat bottom framing directly connective with seat back framing.

Referring now particularly to FIGURE 1 of the drawing, there is indicated a seat base framing 1 comprising front leg or support portions 2, rear legs 3, a bottoms strut 4, diagonal strut means 5 and upper beam or panel section 6. A front lateral tie member 8 is provided between the side framing sections, while a rear lateral tie member 9 is shown extending across the rear of the seat base framing between the top ends of rear leg sections 3.

At each side of the seat base framing and extending outwardly from the rear portion thereof, are provided suitable lugs or projecting arms 10 adapted to hold pin means "P," or other hinge-like means for effecting the lower connection of back seat framing 11 to base frame 1. The back framing shall provide at least up-right framing members 12 along each side portion thereof, with lower end sections 13 to provide pin connection means with the base framing at "P." The seat back framing itself, as shown, is diagrammatic and may consitute any one of various types of panel construction suitable to hold a seat back cushioning such as 14. In other words, various cross struts, bracing members, or panels, may provide the desired strength. Recess means for hinged trays, or for magazine pockets, etc. are not shown in order to simplify the drawing. Actually, conventional seat back framing may be used, except with respect to the hinged and suspension type connection between the seat back and the seat bottom framing.

The movable seat framing, as provided by the present improved system, may comprise tubular sections, such as 15, together with an attached seat pan means 16 adapted to hold a superposed seat cushioning section 17. It is, of course, not intended to limit the present invention to any one type of tubular framing or to any particular seat pan construction and the entire seat framing is indicated diagrammatically as 15. This section shall be pivotally or hingedly connected with the seat back framing 11 at a pivot point elevation B which is a substantial distance, of the order of at least 5″ to 7″, upwardly from pivot point P along the lower end portion of the seat back framing section 11. This arrangement permits the hinged connection level "B" to move along an arc "A" at a radius "r" from the lower pivot point "P" as the seat back framing is lowered. At the same time, the front end portion of the seat framing 15 is slidably or movably supported from a front portion of the seat base framing 1.

In the present diagrammatic drawing, there is indicated a roller support member 18, with a roller 19, along each side portion of the seat base framing 1 such that the roller means 19 can provide a low friction means of supporting the front end of the seat framing 15. The upper surface of the roller means 19 may bear against a flat portion of tubular framing comprising part of unit 15 or ride within suitable channel-type guide means 20 which are attached to the seat framing 15. The channel arrangement is of advantage in precluding lateral displacement of the seat while at the same time permitting fore and aft movement of such seat framing.

In the embodiment of FIGURE 1, there is indicated an angle of approximately 100° with respect to reference point "R" at the juncture between the seat bottom cushioning and the seat back cushioning when the back is in its normal upright positioning. Actually, this positioning is shown providing an approximate 18° of recline from the vertical. There is also indicated an approximate 8° downward or rearward slope of the seat bottom with respect to the horizontal; however, all of these angular relationships are merely suggestive of desired angles for seating comfort and variations of a few degrees may well be made without unduly affecting passenger comfort.

Figure 2:
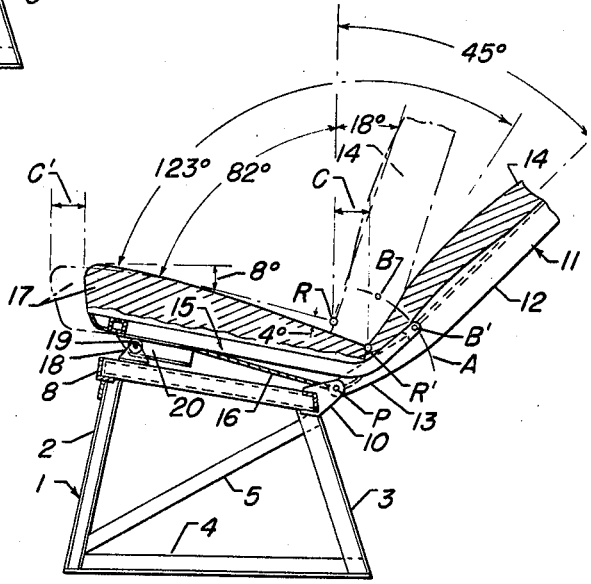
FIGURE 2 of the drawing indicates diagrammatically a similar sectional elevational view, except that the seat back is indicated in a recline position and the seat bottom portion is shown in a retracting, fall-away recline position.

Referring now to FIGURE 2 of the drawing, there is indicated the diagrammatic seat construction of FIGURE 1, with the suspended bottom seat frame 15 and the seat back framing 11 moved to a recline position, where the latter is approximately 45° with the vertical. In this case, it will be noted that the recline of the seat back 11 lowers the pivot connection point "B" (between the seat bottom framing and the seat back framing) to a new position B′ by virtue of such connection point moving along the arc A. At the same time, it will be noted that the reference point R (the juncture between the seat cushioning and back cushioning) will move downwardly and rearwardly to a new reference point "R′," with the aft movement being that indicated by the distance "C." Inasmuch as the aft end portion of the seat framing 15 has a pivoting or hinged-type connection at "B′" with seat back framing 11, there is caused the necessary aft movement of the entire seat framing 15, together with the superposed cushioning 17, there is a corresponding aft movement of the front edge of the seat cushion 17 a distance indicated as "C′" which should be substantially equivalent to the rearward movement "C." However, since the front end portion of the seat framing 15 is supported by or over the roller means 19 at the forward and upper portion of base frame 1, there will be little or no lowering of the front edge portion of the bottom seat cushion 17.

For purposes of showing the angular relationships of an occupant's body in the recline position, it will be noted in FIGURE 2 that the seat back framing 11 has moved from the dashed position of about 18° recline to a full 45° of recline. At the same time, the rear portion of the seat bottom or cushion will acquire a greater slope of about 4° such that there is a total of approximately 12° with respect to the horizontal. The net result is a total angle between the seat bottom and the seat back of about 123°, which in turn is considered to be close to an optimum relationship for seating comfort.

Figure 3:
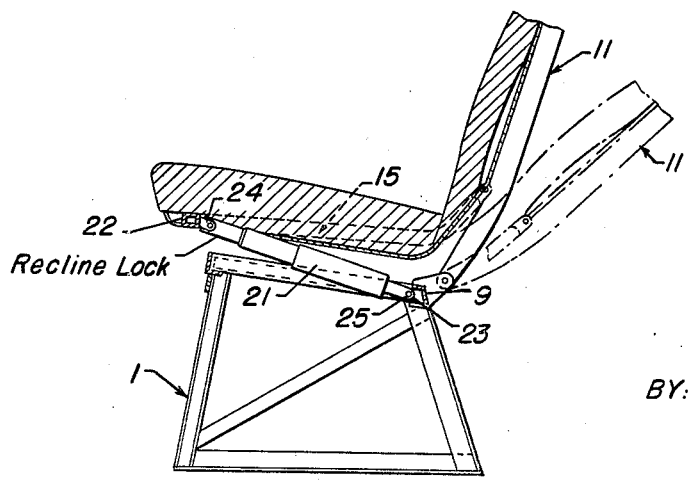
FIGURE 3 of the drawing indicates diagrammatically the positioning of a hydraulic recline-lock being attached between the rear portion of the seat base framing and the seat bottom framing.

In FIGURE 3 of the drawing there is indicated diagrammatically the utilization of a recline lock means 21 directly under the suspended seat framing 15 and connected between the rear and top portion of seat base 1 and a cross beam 22 which may be a normal part of the seat framing 15. In other words, as hereinbefore noted, the direct connection of the seat framing 15 at its aft upper end portion to the seat back framing 11 permits the latter to be locked directly responsive to a locking of the seat bottom framing 15. The recline lock means 21, as indicated, may be of a hydraulic type adapted to be extended and contracted to in turn hold relatively movable members at selected positions with respect to each other. A hydraulic locking device may be of the type disclosed in United States Patent No. 2,922,497 where a cylinder has a quantity of hydraulic fluid and a piston dividing the cylinder into two hydraulic chambers. The piston is connected to a movable piston rod that may extend through an end of the cyinder and serve to adjust the two opposite ends of the cylinder unit. Suitable valve means is of course combined with the hydraulic locking device so as to permit the varying ratio of hydraulic fluid between different portions of the cylinder to in turn effect a greater or lesser extension of one end of the device responsive to the positioning of the internal piston. It is, however, not intended to limit the present adjustment arrangement to any one type of locking device, inasmuch as mechanical adjustment means, including braking types of adjustment means, may well be installed to effect the locking and positioning of the seat bottom section 15 with respect to the seat base 1. Although not shown in the drawing, remote control means may connect to the lock means 21 for either the hydraulic or mechanical types and in turn provide access from a seat arm or other convenient and desired position for a seat occupant whereby to readily lock the recline position.

In this instance lock 21 is shown as having one end connected to clevis means 23 on beam member 9, while an opposing end of the lock connects at clevis means 24 on a seat framing lateral beam section 22. This permits the lock to act against a fixed position at pin 25 and move or lock the seat framing 15 by the holding of lateral beam section 22. Generally, of course, seat movement is accomplished by the occupant pushing or reclining against the seat back and the lock means is provided to, in turn, hold or maintain the desired position as effected manually by the occupant. The advantage of the present under seat lock arrangement resides in the fact that the lock means may be under the central portion of the seat framing 15 and out of the way of other pivot connections or seat framing members. It also obviates the necssity for having a direct connection to any of the seat back framing which is generally more complex and provides less room for pivot or clevis attachment means. In an optional connection arrangement, the recline lock device 21 may be provided with a fixed position connection to the base framing 1 at the upper front end of such framing while a movable or telescoping tubular portion of lock device 21 connects with a rearward portion of the seat bottom framing 15. In other words, it make no difference as to where the connection is made to the seat framing 15, as long as the latter is held in a substantially fixed and locked position.

It is reiterated that all of the framing shown in the present accompanying drawing is merely diagrammatic, although, in all cases, the suspended seat bottom framing shall be directly connective with the lower portion of the tilting back seat framing 11 and be movable therewith. Generally, for aircraft type seating, all framing will be of light weight tubular seat members or of light weight panel sections formed of aluminum or other light weight metals so as to provide adequate structural stability without undue weight. Various modifications may be made with respect to types of pans or panels, and the hinge means at the various pivot points while, at the same time, various modes of effecting the glidable bearing means at the front end of the seat framing are within the scope of the present invention. For example, roller means may be directly attached to the fore and bottom portion of the seat framing 15 and adapted to roll on, or in, suitable guide members on the upper fore portion of the seat base framing 1, rather than have fixed position rollers mounted on the seat base framing. Still further, where desired, various types of energy absorption constructions or elements may be integrated with the seat base framing to assist in passenger safety for crash conditions.

We claim as our invention:

1. A vehicle seat with an adjustable reclining back and a movable seat section providing both retraction and lowering of its rear portion upon back recline, which comprises in combination, base framing, a back frame having its lower end hingedly connected to the top of said base framing from recline pivot point means fixedly positioned adjacent the rear portion thereof, a suspended seat frame with a seat cushioning thereon disposed across the top portion of said base framing and movable in the fore and aft direction with respect to the back frame, said seat frame having upwardly projecting portions at the rear thereof effecting pivot connection means with the seat back frame at a level substantially above said recline pivot point means, and movable support means directly between the front end portion of said seat frame and said base framing whereby, upon seat back frame recline, the rear portion of said seat frame will move down in a proportionate manner to the degree of lowering of the pivot connection means of the seat frame to the back frame and the entire suspended seat frame is moved in an aft direction.

2. The vehicle seat of claim 1 further characterized in that a roller support means is provided between the lower portion of said suspended seat frame and the forward upper portion of said base framing whereby the seat frame will readily move with respect to the latter in a low friction type of movement.

3. The vehicle seat of claim 1 further characterized in that seat back recline lock means having multiple fixed position adjustment is provided in a substantially horizontal position under the central portion of said suspended seat frame with connection means between said seat frame and a portion of said seat base framing, whereby there is a resulting simultaneous locking of any seat bottom position and the connecting seat back frame.

4. The vehicle seat of claim 3 still further characterized in that hydraulic locking means is utilized between a lateral beam portion extending across said base framing and a lateral beam member extending across said suspended seat frame, whereby there is effected a locking of the seat frame and the connecting seat back frame to the fixed position base framing.

References Cited

UNITED STATES PATENTS

| 1,604,001 | 10/1926 | Vetchik | 297—316 XR |
| 2,016,133 | 10/1935 | Chandler | 297—318 |
| 2,508,598 | 5/1950 | Dean et al. | 297—318 XR |
| 2,522,246 | 9/1950 | Armstrong | 297—318 |
| 2,658,561 | 11/1953 | Caldemeyer et al. | 297—318 |
| 2,778,408 | 1/1957 | Krikorian | 297—316 |
| 3,210,119 | 10/1965 | Schliephacke | 297—322 |

BOBBY R. GAY, Primary Examiner

G. O. FINCH, Assistant Examiner